UNITED STATES PATENT OFFICE.

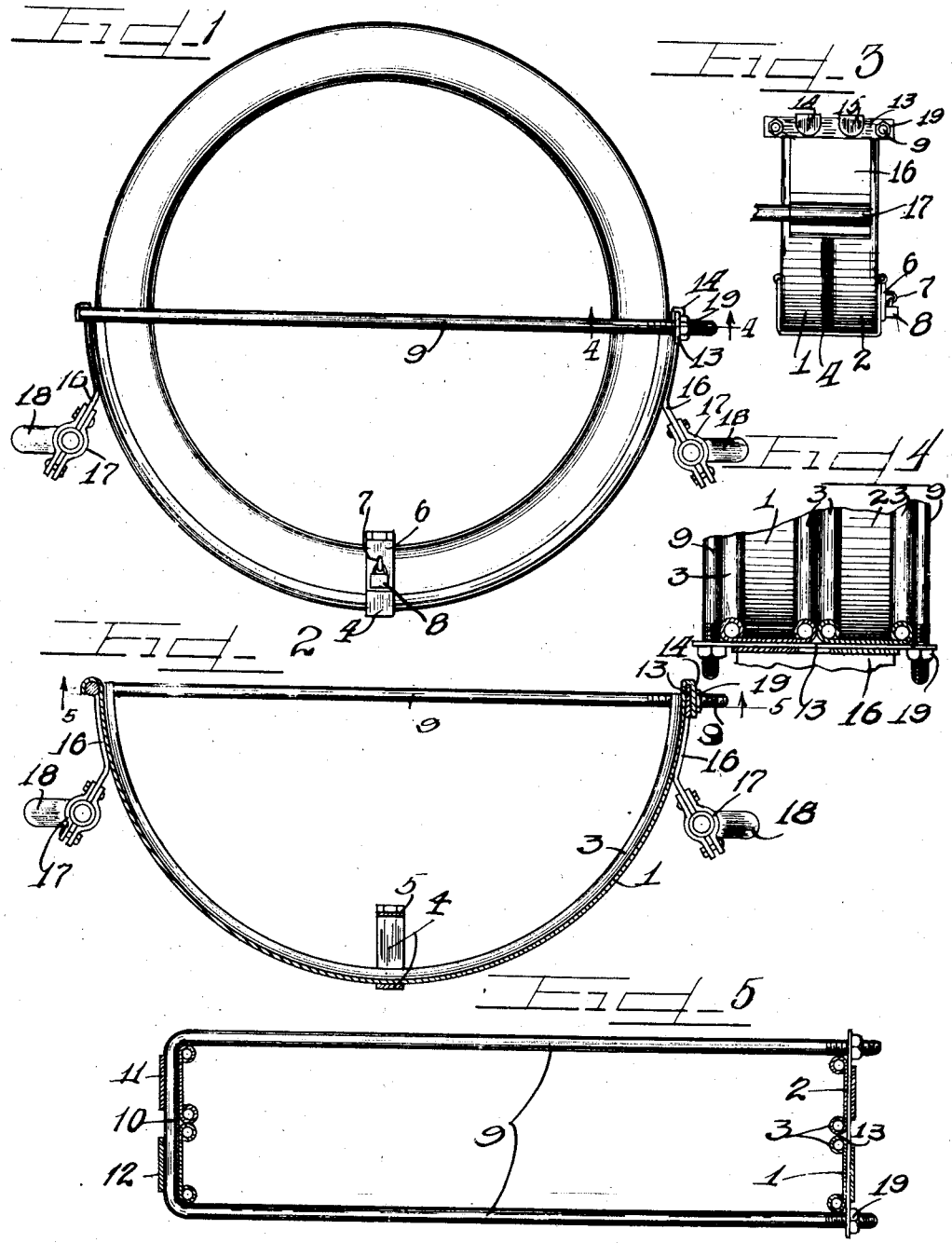

WALTER R. GREEN, OF CHICAGO, ILLINOIS.

ADJUSTABLE TIRE-CARRIER.

1,344,202.  Specification of Letters Patent.  Patented June 22, 1920.

Original application filed November 15, 1916, Serial No. 131,393. Divided and this application filed October 30, 1917. Serial No. 199,232.

*To all whom it may concern:*

Be it known that I, WALTER R. GREEN, a citizen of the United States, and a resident of the city of Chicago, in the county of Cook and State of Illinois, have invented certain new and useful Improvements in Adjustable Tire-Carriers; and I do hereby declare that the following is a full, clear, and exact description of the same, reference being had to the accompanying drawings, and to the numerals of reference thereon, which form a part of this specification.

This invention relates to improvements in an adjustable tire carrier, and is a division of my prior application for patent for "adjustable tire carrier," filed November 15th, 1916, Serial No. 131,393.

It is an object of this invention to construct an expansible and contractible tire carrier, adapted to receive a tire placed therein, which is adjustable to change the interior diameter of the carrier to accommodate the tire even though the same is deformed or increased in size after use.

It is further an object of this invention to provide a channel tire carrier and an expanding and contracting bolt to vary the diameter of the same for snugly holding tires varying slightly in diameter.

The invention (in a preferred form) is illustrated in the drawings, and more fully hereinafter described.

On the drawings:

Figure 1 is a side elevation of a tire carrier embodying my invention, with a tire secured thereto.

Fig. 2 is a central vertical section taken through one of the channel carriers.

Fig. 3 is an end elevation of a device embodying my invention.

Fig. 4 is an enlarged detail sectional view of one end of the carrier taken on the line 4—4 of Fig. 1.

Fig. 5 is a section taken on line 5—5 of Fig. 2.

As shown on the drawings:

The tire carrier as illustrated, is adapted to carry two tires, but, of course, may be constructed to carry but one tire, or more than two. 1—2 indicate semi-circular channel members constructed of sheet metal, and each provided with a bead 3, at each edge thereof, between which the tire fits. Secured centrally to the channel members, is U plate 4, to one arm of which is pivoted a plate 5, to which is pivoted a hasp 6, adapted to engage on an eye 7, which is adapted to receive a lock 8, by means of which the tires are locked in the carrier. The expanding bolt 9, is in the shape of a U bolt, though obviously, any kind of bolt could be used and could extend between the two channels, if desired. The connected end 10, of the U bolt, is engaged to the upper ends of the channels by having lips or flanges 11—12, integral with the channels, turned around the member 10. A bar 13 is brazed to the opposite ends of the channels 1—2, and lips or flanges 14—15. are turned thereover. The ends of the U bolts project through the ends of the bar 13, and nuts 19, are threaded on the ends of the bolts by manipulation of which the channel members may be contracted or released to permit expansion thereof.

Brackets 16, are secured to opposite ends of the channel members, to each of which is secured a clamping member 17, adjustably secured to which is an attaching rod or pipe 18.

The operation is as follows:

The tires are inserted in the channel carriers and secured therein from theft by means of the lock. If the tires fit too loosely, the channel member may be contracted by bending by means of the bolt 9. Should the tires be of too great diameter, the nuts 14, are loosened the required amount and the tire carriers expanded by shoving the tire therein or by the hands. In any event, the channel carrier may be expanded and contracted within the limits for which made to snugly hold tires therein locked from unauthorized removal.

Details of construction may be varied through a wide range without departing from the principles of my invention. I therefore do not purpose limiting myself otherwise than necessitated by the prior art.

I claim as my invention:

1. A tire carrier comprising a unitary channel member, an expanding and contracting bolt connecting the tops of the channel member, adapted to expand and contract said channel member by bending the same, and adjustable attachable brackets secured to the channel member.

2. A tire carrier, constructed of a unitary sheet of metal bent longitudinally in substantially semi-circular form to receive the lower half of a tire and capable of being expanded and contracted by bending, a bolt connecting the opposite ends of said channel member, and means coacting therewith for bending said channel member.

3. A tire carrier comprising a channel member, and a U bolt connected to the opposite ends of the channel member for bending the same to accommodate tires of different size.

4. In a tire carrier, a channel member beaded at the edges, a bar secured to one end of the channel member, a bolt secured at one end to one end of the channel member and extending through said bar at its opposite end, means engaged on the bolt for bending the channel member, brackets secured to each end of the channel member, clamps secured to the brackets, and attaching rods adjustably secured to the clamps.

5. In a tire carrier the combination of a strip bent longitudinally in a semi-circular form to circumferentially engage substantially the lower half of a tire, rods adapted to admit a tire therebetween and adjustably connecting the ends of the strip so as to change the curvature thereof by bending to conform to tires of different size, and brackets for supporting the strip so as to permit contraction and separation of the ends thereof.

6. A device of the class described, comprising a unitary substantially semi-circular member shaped to receive a tire therein, and a bolt for bending said member to change the size thereof to adapt it to fit tires of different sizes.

7. In a tire carrier the combination of a unitary band bent longitudinally in a semicircular form so as to circumferentially engage substantially the lower half of the tire, and a diametrical brace adjustably connecting the opposite ends of the semicircular band and adapted to change the curvature by bending of the band to correspond to the adjustment of the diametrical brace so that the band assumes a shape to fit the circumference of a tire of substantially corresponding diameter placed therein.

8. In a tire carrier the combination of a unitary member bent longitudinally in a semicircular form so as to circumferentially engage substantially the lower half of the tire, and a diametrical brace detachably connecting the opposite ends of said member and adapted to afford adjustment to vary the curvature of said member by bending thereof to fit the circumference of tires of different size.

9. In a tire carrier for a plurality of tires the combination of a plurality of flat strips bent longitudinally in a semicircular form so as to circumferentially engage substantially the lower half of the tire, said strips being placed edge to edge so that each strip forms a separate support for a tire, supporting means for said strips permitting contraction and separation of the opposite ends of the strips by bending thereof, and a diametrical brace at the outer side of each strip adjustably connecting the opposite ends thereof for varying the curvature of the strips to fit the circumference of tires of different size.

10. A device of the class described, comprising a unitary substantially semi-circular member shaped to receive a tire placed therein, and means for bending said member to change the size thereof to adapt it to fit tires of different sizes.

In testimony whereof I have hereunto subscribed my name in the presence of two subscribing witnesses.

WALTER R. GREEN.

Witnesses:
CHARLES W. HILLS, Jr.,
EARL M. HARDINE.